US006894723B1

United States Patent
Li

(10) Patent No.: US 6,894,723 B1
(45) Date of Patent: May 17, 2005

(54) RANKING-BASED AUTOMATIC DARK COMPENSATION CIRCUIT

(75) Inventor: Chung-Chi Jim Li, San Jose, CA (US)

(73) Assignee: IC Media Corporation, Santa Clara, CA (US)

( * ) Notice: Subject to any disclaimer, the term of this patent is extended or adjusted under 35 U.S.C. 154(b) by 747 days.

(21) Appl. No.: 09/960,166

(22) Filed: Sep. 21, 2001

(51) Int. Cl.$^7$ .......................... H04N 5/217; H04N 9/64
(52) U.S. Cl. ....................................... 348/243; 348/241
(58) Field of Search ................................. 348/243, 241

(56) References Cited

U.S. PATENT DOCUMENTS 5,818,900 A * 10/1998 Vogelsong et al. ............ 378/62
5,878,358 A * 3/1999 Parsons et al. ................. 701/1

* cited by examiner

Primary Examiner—Andrew Christensen
Assistant Examiner—Brian Jelinek
(74) Attorney, Agent, or Firm—Fernandez & Associates, LLP

(57) ABSTRACT

A ranking-based automatic dark compensation circuit for efficiently estimating dark level in a CCD or CMOS image sensor. The ranking circuit comprises of k staggered comparators, each comparator having an associated temporary result register. Each comparator having two inputs, with the first input coupled to an output of the previous stage comparator and the second input coupled to its associated temporary result register. The temporary results are initialized to the largest possible dark value. At each stage, a comparison is made of a new input sample to a stored value of the temporary register. If the new sample is greater than the value of the associated temporary register, the value in temporary register is not changed and the new sample is passed to the next comparator. Conversely, if the new sample is smaller, then that new sample is stored into the temporary register, while the original temporary result is passed to the next comparator. The temporary result of the last stage is the final estimated dark level output.

6 Claims, 3 Drawing Sheets and/or the number of comparators in the circuit.

RANKING-BASED AUTOMATIC DARK COMPENSATION CIRCUIT

FIELD OF INVENTION

The invention relates to the field of microelectronic circuits in the image sensing devices.

BACKGROUND INFORMATION

In a CCD or CMOS image sensor, the optical dark level is usually non-zero and needs to be subtracted from the normal ADC output level in order to obtain the true signal level. To obtain appropriate estimate of this optical dark level, multiple samples at various places in the sensor array are taken and assessed. The most commonly used method is to perform an averaging operation on these samples, either using an analog integration circuit or digital accumulator. However, if one or more of the sample points is a defect pixel the averaged measurement will be biased and the entire image will either become too dark or too bright. Defect pixels occur quite often in the sensor array and can be the result of imperfect black filters, which causes light leak, or blooming due to neighboring saturated pixels, among other things. The occurrence of defect pixels may distort the estimated dark level enough to render the chip unusable.

SUMMARY OF THE INVENTION

The invention eliminates the damaging effects of defect dark pixels associated with averaging operations by choosing the kth smallest sample among n samples as the estimation of the dark level. Thus, if there are defects among the n sample pixels that result in abnormal dark values, these values will be excluded as long as they are lower or higher than the kth smallest sample. In this manner, this circuit can always tolerate at least k−1 defects.

The invention implements the idea with a ranking-based dark compensation circuit. The ranking circuit comprises of k-stage staggered comparators, each comparator coupled to an associated temporary result register. Each comparator also having two inputs, with the first input coupled to an output of the previous stage comparator and the second input coupled to its associated temporary result register. The temporary results registers are initialized to be the largest possible dark value, and the samples are input into the circuit sequentially. At each stage, if the new sample is larger than the temporary result in the associated temporary result register of that comparator, the temporary result is not changed and the new sample is passed to the next comparator. If the new sample is smaller than that of the temporary result register, the new sample replaces the temporary result and the original temporary result becomes the new data passed to the next comparator. After all samples are processed, the temporary result of the last stage (kth stage) is the final estimated dark level and the output of the dark compensation circuit.

DETAILED DESCRIPTION

Figure 1:
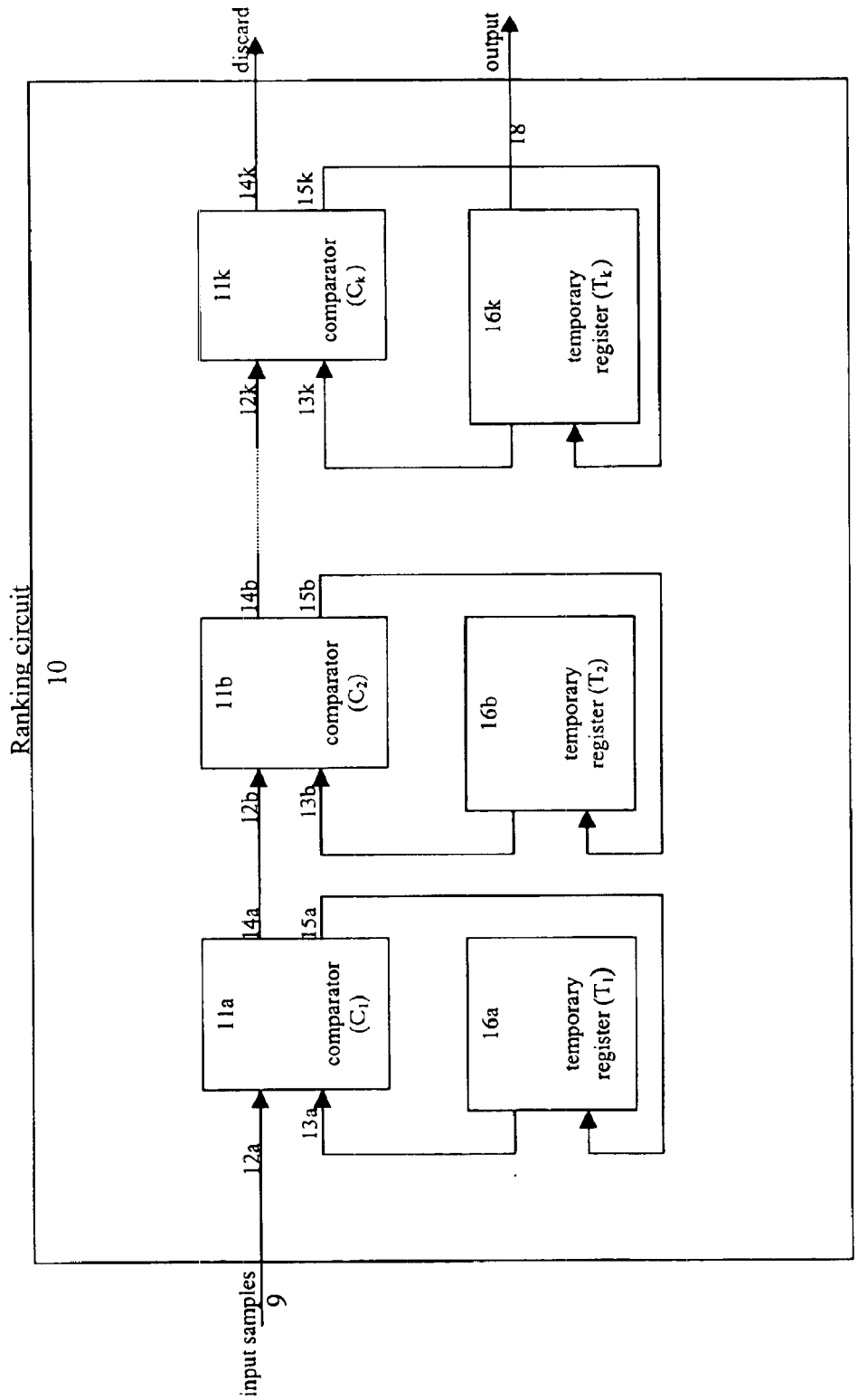
FIG. 1 is a generalized schematic block diagram of the ranking-based automatic dark compensation circuit.

FIG. 1 is a generalized schematic block diagram of the ranking circuit 10. Ranking circuit 10 comprises of k-staggered comparators, $C_1$ through $C_k$. Each comparator is coupled to an associated temporary result register, labeled $T_1$ through $T_k$. Each comparator comprises two inputs. The first input is coupled to receive an output of the previous comparator and the second input is coupled to receive a value stored in the associated temporary result register. For example, in FIG. 1, first comparator ($C_1$) 11a is coupled to receive at its first input 12a input dark compensation sample 9. The samples are obtained from dark compensation pixels located in the image sensor. At its second input 13a comparator 11a is coupled to receive a value stored in temporary result register ($T_1$) 16a. Each comparator also provides two outputs. The first output is coupled to transmit input to the next comparator and the second output is coupled to transmit input to its associated temporary result register. For example, in FIG. 1, the first comparator ($C_1$) 11a is coupled at its first output 14a to second comparator ($C_2$) 11b. At its second output 15a, comparator 11a is coupled to transmit a value to store in temporary result register 16a. Thus, the comparators $C_1$ through $C_k$ are coupled together by described inputs and outputs, and each temporary result register both receives input from and sends output to the associated comparator. Temporary result register 16k comprises an additional output 18 that is coupled to the final output of ranking circuit 10.

Figure 2:
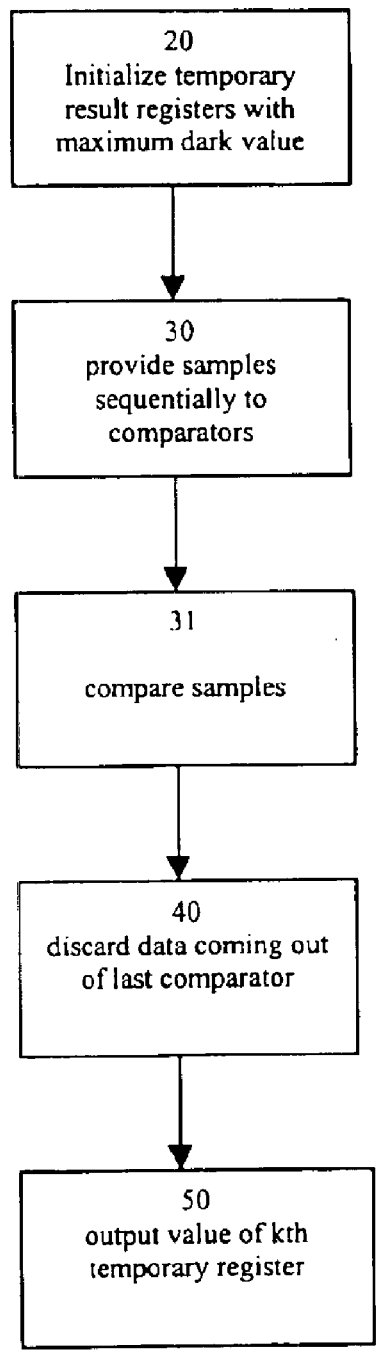
FIG. 2 is a flow chart describing the process of the ranking-based automatic dark compensation circuit.

The flowchart in FIG. 2 illustrates the process enacted by the automatic dark compensation circuit, which begins in step 20 by initializing the values of the temporary result registers $T_1$ through $T_k$ to be the largest possible value, e.g. the largest value the registers can hold or the largest possible value for the optical dark level. In the next step, 30, the dark compensation samples are pumped into ranking circuit 10 sequentially as input into comparator $C_1$. Step 31 is a determining step, taken simultaneously by all of the comparators $C_1$ through $C_k$ in the dark compensation circuit. Determining step 31 is depicted in more detail by a flow chart in FIG. 3.

Figure 3:
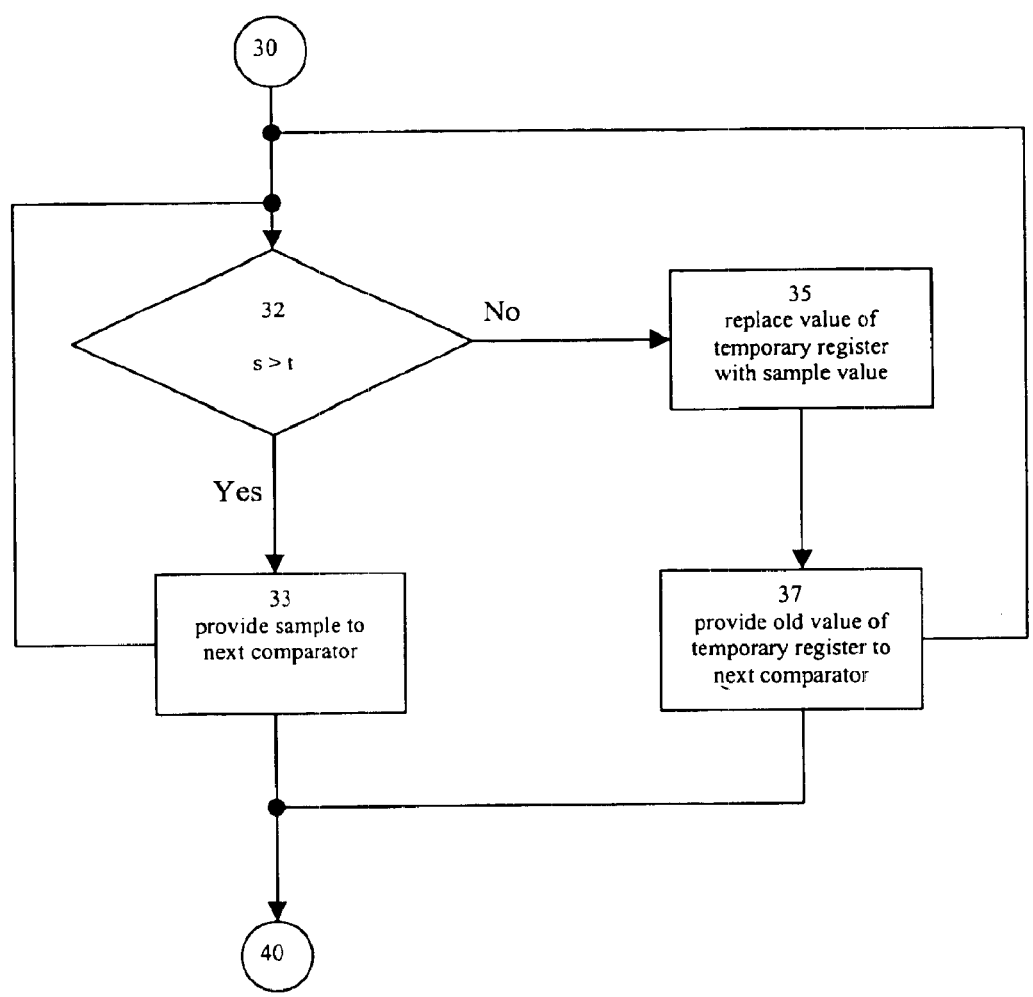
FIG. 3 is a more detailed illustration of step 31 of the process of FIG. 2.

Each comparator performs the following determining steps, as illustrated in FIG. 3. As the samples proceed sequentially into each comparator from step 30, the comparator compares the value, s, of the incoming sample to the value, t, stored in the temporary result register. In step 32, if s>t, then the value of the sample, s, is output to the next comparator in step 33, and said comparator repeats the determining operation. If s is not greater than t, then process proceeds to step 35, wherein the sample s replaces the value in the temporary result register. Then, in step 37, the old value of the temporary result register is provided as output to the next comparator, which repeats the determining operation. As there is no next comparator following the last comparator $C_k$, data output through 14k is discarded, as FIG. 2 step 40 illustrates. In this manner the dark compensation circuit orders the dark compensation values of the image sensor, wherein upon completion of the process, the kth smallest dark compensation value is stored in the last temporary result register $T_k$ as desired output of ranking circuit 10. In final step 50, dark compensation circuit 10 provides to output 18 the kth smallest sample from temporary register $T_k$.

In a preferred embodiment, a global reset is provided to quickly reset the tap registers so that the process may be started anew by means of a global reset line added to the circuit.

Additionally, the time required to perform the ranking-based dark compensation method may be altered by varying the number of dark compensation samples and/or the number of comparators in the circuit.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks.

Other variations and embodiments are possible in light of above teachings, and it is thus intended that the scope of invention not be limited by this Detailed Description, but rather by claims following.

I claim:

1. A ranking-based dark compensation circuit comprising:
a set of comparators, wherein each comparator is coupled to an associated temporary result register, each comparator comprising a first input and a second input, the first coupled to receive an incoming sample and the second input coupled to an output of the associated temporary register to receive a value stored in the associated temporary register, and each comparator compares the incoming sample with the stored temporary register value; and
if the value of the sample is greater than the value of the temporary register, then provides that sample to a next comparator or, if there is no next comparator, to a discard area; and
if the value of the sample is less than the value of the temporary register, then stores that sample in the temporary register and provides the original value of the temporary register to a next comparator or, if there is no next comparator, to a discard area; and an output value stored in the kth temporary result register.

2. The circuit of claim 1 additionally comprising a global reset line.

3. The circuit of claim 1 wherein the number of samples and the number of comparators are variable.

4. A ranking-based automatic dark compensation method for a dark compensation circuit comprising a set of k numbered comparators, comprising the steps of:
initializing a set of temporary result registers with a maximum dark value;
providing a sequence of samples to the set of k comparators, wherein each comparator is coupled to an associated temporary result register, and each comparator executes the following steps:
comparing the sample to the value of the associated temporary result register, wherein
if the value of the sample is greater than the value in the temporary register, then providing that sample to a next comparator;
if the value of the sample is less than the value in the temporary register, then storing that sample value in the temporary register and providing the original value of the temporary register to a next comparator;
discarding the values that output the kth comparator; and
providing a dark compensation value output in the kth temporary register as an output of the dark compensation circuit.

5. The method of claim 4 comprising the additional step of resetting
the entire circuit by means of a global reset line.

6. The method of claim 4 wherein the number of samples and the number of comparators are variable.

* * * * *